Sept. 26, 1961            R. G. GREEN            3,001,300
APPARATUS FOR SIMULATING THE INSTRUMENT FLYING
CONDITIONS IN OPERATIONAL AIRCRAFT
Filed Aug. 30, 1960                          2 Sheets-Sheet 1
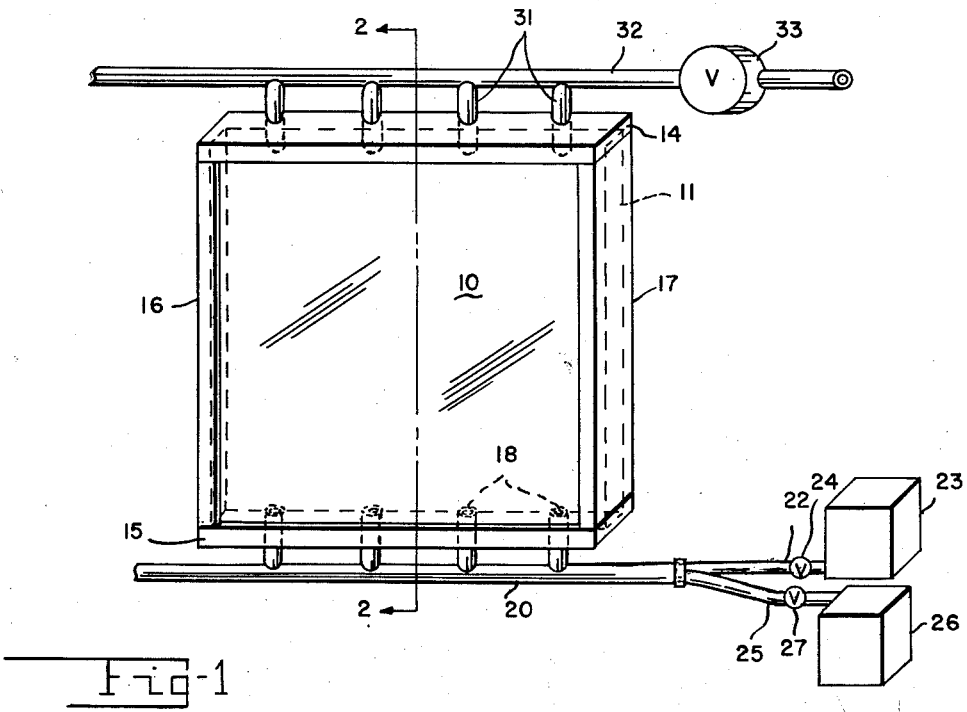
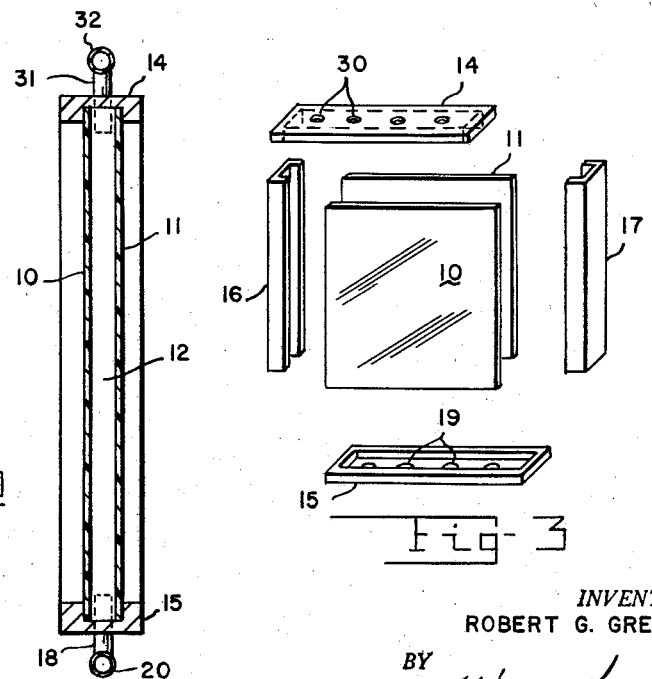
INVENTOR.
ROBERT G. GREEN
BY
ATTORNEYS

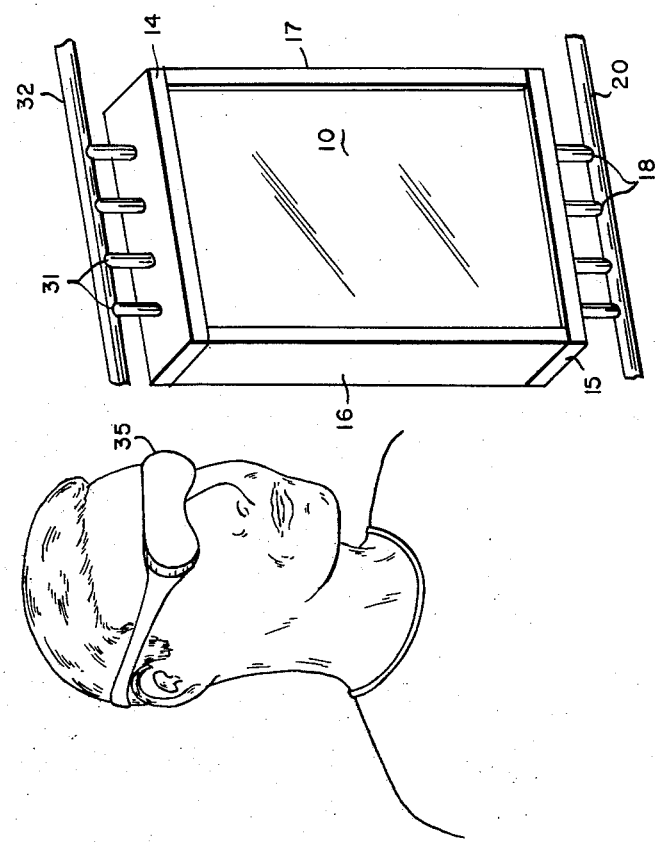

3,001,300
APPARATUS FOR SIMULATING THE INSTRUMENT FLYING CONDITIONS IN OPERATIONAL AIRCRAFT

Robert G. Green, R.R. 1, New Carlisle, Ohio
Filed Aug. 30, 1960, Ser. No. 53,015
1 Claim. (Cl. 35—12)
(Granted under Title 35, U.S. Code (1952), sec. 266)

The invention described herein may be manufactured and used by or for the United States Government for governmental purposes without payment to me of any royalty thereon.

The present invention relates to apparatus installed in an aircraft for simulating divers aircraft instrument flying conditions in operational aircraft under daylight flying conditions.

In the training of pilots for advanced types of aircraft, steps must be taken to provide realistic means for simulating many types of flying conditions that will be encountered during operation of the aircraft. One phase of this training should include instrument flying under simulated conditions in an operational aircraft while it is in flight.

Mock up instrument trainers provide many excellent training facilities for various phases of pilot training. However, many of the phases of instruction and check-out procedures must take place in a fully operational aircraft during flight. One phase of this training includes subjecting the student pilot to situations where the pilot's vision outside of the airplane cockpit is anywhere from zero to 100 percent maximum visibility. During the situations where the student pilot's visibility outside the aircraft cockpin may be limited, his visibility of the instrument panel of the aircraft must be fully maintained.

During training flights where these conditions are being simulated, the student pilot is accompanied by an instructor pilot whose vision for obvious safety reasons must not be severely impaired at anytime. Prior to this time, various types of hoods and canopies adapted to cover the student pilot have been used with limited success to meet the requirements set out above. It has also been known to cover the windshield with a colored plastic film, for example green in color, and have the student pilot wear goggles with red glass lenses so that when he looks through the windshield he will see darkness but will still be able to read the instruments within the cockpit. However, these devices normally give the student pilot zero vision outside of the cockpit and fail to provide means for simulating only limited or intermediate outside vision. It is well known that various types of weather conditions create many different types of limited visibility conditions. It is also well known that during the flight of an aircraft, the pilot is often confronted with visibility conditions that are rapidly changing. A typical example of these rapidly changing visibility conditions occur where an aircraft flies through scattered cloud formations. Another example would be a flight through a variable density fog which often appears very rapidly. During many of these various weather conditions, the space at lower altitudes may be completely free. A supersonic aircraft that is making a landing approach will break out of the fog or similar weather present at higher altitudes at tremendous speeds thereby giving the pilot of the aircraft rapidly changing visibility sensations. An object of the present invention is to provide apparatus to subject a student pilot to all of these various conditions during his training as a pilot and during check-out flights on various aircraft.

Unsatisfactory attempts to simulate flight conditions of limited visibility have previously been made with various combinations of colored windshield filters and colored goggles as previously noted. These types of apparatus do limit the pilot's vision outside of the cockpit and cannot be readily cleared in case of emergency. They also fail to allow the visibility to be varied to simulate the rapidly changing visibility conditions actually encountered during flight of the aircraft.

Broadly speaking, the present invention consists of a pair of transparent members sealed around their perimeter and held in juxtaposition to form a closed reservoir. The apparatus is mounted adjacent to the windshield or in the windshield opening to replace the normal windshield and includes means to inject a filtering media in the form of a colored fluid and air mixture in the desired proportions into the reservoir. The colored fluid and air mixture is of a prescribed uniform color and operates as a variable density filter to filter any part or all of the light rays in a specific position section of the visible light spectrum. The color of fluid used will describe the specific sector of the visible spectrum from which light is to be filtered. The filtering efficiency will be dependent upon the colored fluid to air ratio contained in the reservoir.

In one embodiment of the instant invention the student pilot wears a pair of colored filter goggles which filter out all the visible light in the sector of the spectrum which is not affected by the colored fluid filter. The instructor pilot does not wear any goggles and thus his vision is only slightly limited by the filtering action of the windshield apparatus.

In a second embodiment of the instant invention, the fluid to air mixture is proportioned to provide a variable density fluid-air filter which will absorb light rays throughout the visible spectrum in such a manner that the student pilot is not required to wear colored goggles. In this type of installation, a periscope or similar apparatus is installed in the aircraft to give the instructor pilot outside visibility.

Other features, objects and advantages of the present invention will be apparent from a detailed study of the specification and claim hereinafter given with reference to the attached drawings in which:

FIG. 1 is a perspective view showing the elements or the apparatus of the instant invention;

FIG. 2 is a view in side elevation taken along the line 2—2 of FIG. 1;

FIG. 3 is an exploded view of the main elements of the reservoir of the instant invention including the transparent members and surrounding sealing elements; and FIG. 4 is a perspective view of the apparatus including the student pilot wearing goggles in accordance with the instant invention.

Referring more particularly to the drawings, FIG. 1 discloses filtering means including an outer transparent member 10 and an inner transparent member 11 held in juxtaposed position by mounting and sealing means. The inner and outer transparent members are mounted in fluid tight engagement with sealing and mounting rims and are held a short distance apart to form a closed reservoir 12 therebetween. The sealing and mounting means include an upper channel 14, a lower channel 15 and end channels 16 and 17 interconnecting the upper and lower channels. The transparent members 10 and 11 are secured to the channels along their edges by a suitable adhesive. The transparent members as illustrated are of a clear Plexigas material but could be plate glass, safety glass or any similar equivalent clear transparent material. The mounting and sealing means, per se, are part of the instant invention and any equivalent sealing and mounting means could be used.

Nozzle means in fluid communication with the reservoir are provided including a plurality of injection nozzles 18 mounted in the lower sealing channel 15. The nozzles are shown as having a force fit in apertures 19 in the lower channel 15 but could be threaded into apertures in the sealing channel or mounted in an equivalent manner. Inlet conduit means in fluid communication with said nozzle means are provided including an inlet line 20 connected to each of the injection nozzles.

The inlet line 20 extends beyond the series of injection nozzles to be attached to other reservoir assemblies, not shown, mounted in the aircraft. The air supply line 22 is attached to an air storage tank 23 which contains a supply of air stored under pressure. An air valve 24 is mounted in the air supply line 22 to control the flow of air into the reservoir 12.

A colored fluid supply line 25 is connected to the inlet line 20 and to a colored fluid storage tank 26. A control valve 27 is mounted in the supply line 25 for regulating the amount of colored fluid delivered to the supply line 20. The colored fluid can be stored in the storage tank 26 in either gaseous or liquid state under pressure. If the colored fluid is stored in a liquid state, a vaporizer jet nozzle (not shown) should be mounted in the colored fluid inlet line to insure complete vaporization of the liquid into a gaseous state.

By opening the air valve 24 and closing the colored fluid valve 27, air under pressure can be introduced into the reservoir 12 and the colored fluid and air mixture will be rapidly diluted and exhausted through the bleeder ports 30 until only air remains in the reservoir 12. The bleeder ports 30 are formed in the upper sealing channel and are in fluid communication with outlet pipe 31 mounted in the upper sealing channel 14. The outlet pipe 31 is attached to the exhaust line 32 which is vented to the exterior of the aircraft. The pressure relief valve 33 is mounted in the exhaust line and is adapted to open when the pressure within the reservoir 12 exceeds a predetermined level and thereby allows the fluid-air mixture to be exhausted to the atmosphere.

Bromine gas is an example of a colored fluid that can be used in the apparatus of the instant invention. Bromine gas has an amber color and will filter out light rays at one end of the visible spectrum. The filtering efficiency of the bromine gas will depend upon the ratio of the gas to air mixture. As the ratio of bromine to air is increased, the absorption efficiency of the bromine gas is increased and therefore absorbs more and more visible light at one end of the visible spectrum.

In the first embodiment of the instant invention, the student pilot wears transparent goggles 35 of colored material that filters out light rays from the other end of the visible spectrum. When bromine gas is the colored gas that is used, transparent blue Plexiglas material cooperates with the filtering action of the bromine gas to provide satisfactory limited visibility conditions.

The instructor pilot accompanying the student pilot does not wear goggles and thus his visibility is limited only slightly by the colored gas contained in the reservoir. It is contemplated that gases, other than bromine may be used with the apparatus of the invention. Examples of other gases include nitrogen oxide, nitrosyl bromide and nitrogen trioxide and the like. While each of these particular gases is of an amber color, it is contemplated that gases having other colors can be used. It is to be understood that smokes can be used instead of a time gas. The color of transparent material used for the goggles will be determined by the filtering characteristics of the colored fluid that is used. For purposes of illustration, the tank 23 has been described as containing air but other clear gases could be used instead of air. Also outside air could be scooped in to provide a ram pressure air supply.

The colored fluid-air ratio can be regulated by adjusting the air valve 24 and the colored fluid valve 27 to simulate various visual conditions that are encountered during the flight of an aircraft. By using a ratio favoring air, the visibility of the student pilot is only slightly impaired by the absorption of the colored fluid thereby simulating a condition similar to fog. By using a ratio favoring colored fluid, outside visibility of the student pilot can be brought to almost zero by the absorption action of the colored fluid and the goggles, thereby simulating night flying conditions. Pure air may be introduced into the reservoir 12 by closing the colored fluid valves 27 to exhaust the colored fluid-air mixture from the reservoir very rapidly in case of emergency and to simulate conditions occurring when the aircraft breaks out of the fog or similar weather.

The apparatus of the instant invention can be installed in an aircraft in two different ways. One method of mounting is to mount the transparent members in the windshield openings of the aircraft to replace the normal windshields for the aircraft. It should be noted that while the transparent members have been illustrated as having planar surfaces, it is contemplated that they can be curved into the forms of canopies found on modern aircraft. The other method of installation in an aircraft entails mounting the transparent members on the interior of and adjacent to the existing aircraft windshield thus eliminating any major structural modifications of production line aircraft.

The instant invention can also be used in a manner in which the student pilot is not required to wear goggles. In such an installation, a periscope auxiliary windshield or similar device would be required to be mounted in the aircraft cockpit to give the safety or instructor pilot satisfactory outside visibility. In this case, the windshield filter would utilize a gas, smoke or combination of gases or both, to produce a variable density fluid-air filter which would absorb light rays throughout the visible spectrum. The apparatus of the instant invention, used in this manner, would operate to vary the student's outside visibility without the use of goggles and would maintain the visibility of the safety or instructor pilot through the periscope auxiliary windshield or similar device. In this type of installation, the colored fluid mixture can be quickly cleared in case of emergency to provide full visibility of both the student pilot and the instructor pilot.

While the form of the apparatus described constitutes a preferred embodiment of the invention, it is to be understood that the invention is not limited to this precise form of apparatus and that changes and modifications may be made without departing from the scope of the invention which is defined in the appended claim.

What is claimed is:

In an aircraft windshield assembly that simulates a plurality of visibility limitations inclusive of limitations that require instrument flying and the windshield assembly comprising: a plurality of transparent members defining a closed reservoir therebetween and having edges; a plurality of channel means in sealing relation with the edges of the transparent members to provide the closed reservoir; injection nozzle means mounted in the channel means at one edge of the closed reservoir; outlet pipe means mounted in the channel means at one edge of the closed reservoir remote from the injection nozzle means; an exhaust line connected to the outlet pipe means for evacuating the closed reservoir; a pressure relief valve in the exhaust line and controlling the pressure therein; an inlet line connected with the injection nozzle means; an air storage tank valved into the inlet line for filling the closed reservoir with air to be removed over the exhaust line; and a closed fluid storage tank valved into the inlet line for mixing controlled quantities of colored fluid with air from the air storage tank fed into the closed reservoir to replace evacuations through the exhaust line and to impart a desired opacity to the closed reservoir.

(References on following page)

References Cited in the file of this patent

UNITED STATES PATENTS

| | | |
|---|---|---|
| 1,903,917 | Dysart | Apr. 18, 1933 |
| 1,940,040 | Arms | Dec. 19, 1933 |
| 2,373,214 | Wolkenhauer | Apr. 10, 1945 |
| 2,439,553 | Winn | Apr. 13, 1948 |
| 2,474,712 | Aparicio | June 28, 1949 |
| 2,489,751 | Candler | Nov. 29, 1949 |
| 2,510,848 | Wood | June 6, 1950 |
| 2,572,656 | Ortenburger | Oct. 23, 1951 |
| 2,596,566 | Lacy et al. | May 13, 1952 |

FOREIGN PATENTS

| | | |
|---|---|---|
| 607,217 | Great Britain | Aug. 27, 1948 |